C. C. TUCH.
ELECTRIC ANIMAL AND INSECT EXTERMINATOR.
APPLICATION FILED OCT. 17, 1911.

1,031,492.

Patented July 2, 1912.

2 SHEETS—SHEET 1.

Witnesses
William R Smith
V. B. Hillyard

Inventor
Christian C. Tuch.
By Victor J. Evans
Attorney

C. C. TUCH.
ELECTRIC ANIMAL AND INSECT EXTERMINATOR.
APPLICATION FILED OCT. 17, 1911.

1,031,492.

Patented July 2, 1912.

2 SHEETS—SHEET 2.

Witnesses
William R Smith
V. B. Hillyard.

Inventor
Christian C. Tuch.
By Victor J. Evans
Attorney

UNITED STATES PATENT OFFICE.

CHRISTIAN C. TUCH, OF HONOLULU, TERRITORY OF HAWAII.

ELECTRIC ANIMAL AND INSECT EXTERMINATOR.

1,031,492.　　　　Specification of Letters Patent.　　Patented July 2, 1912.

Application filed October 17, 1911. Serial No. 655,104.

*To all whom it may concern:*

Be it known that I, CHRISTIAN C. TUCH, a citizen of the United States, residing at Honolulu, Oahu, Hawaii, have invented new and useful Improvements in Electric Animal and Insect Exterminators, of which the following is a specification.

This invention provides for the rapid and humane extinction of insects, rodents, and like pestiferous animals, the purpose being the provision of an exterminator depending upon electricity for the life destroying agent, the device being of such structure as to embody means both for destroying animals and insects.

The invention consists of the novel features, details of construction and combination of parts, which hereinafter will be more particularly set forth, illustrated in the accompanying drawings, and pointed out in the appended claims.

Figure 1:
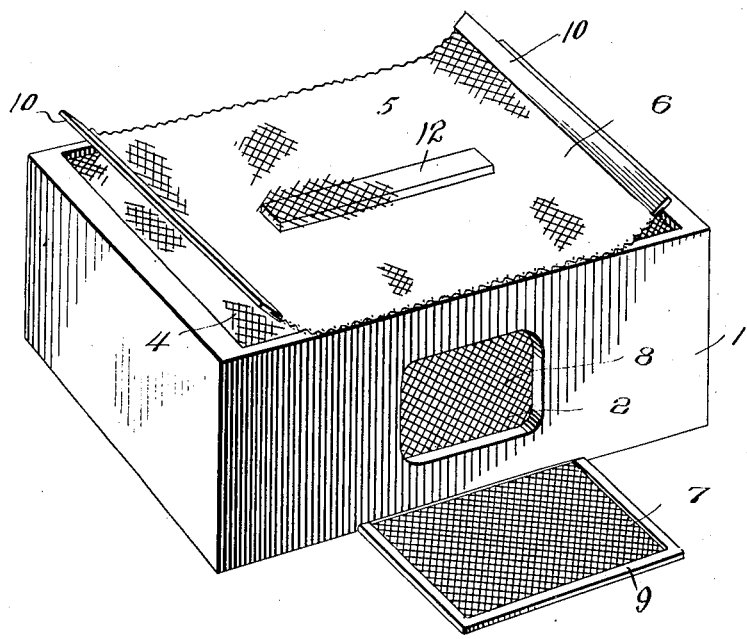
Figure 3:
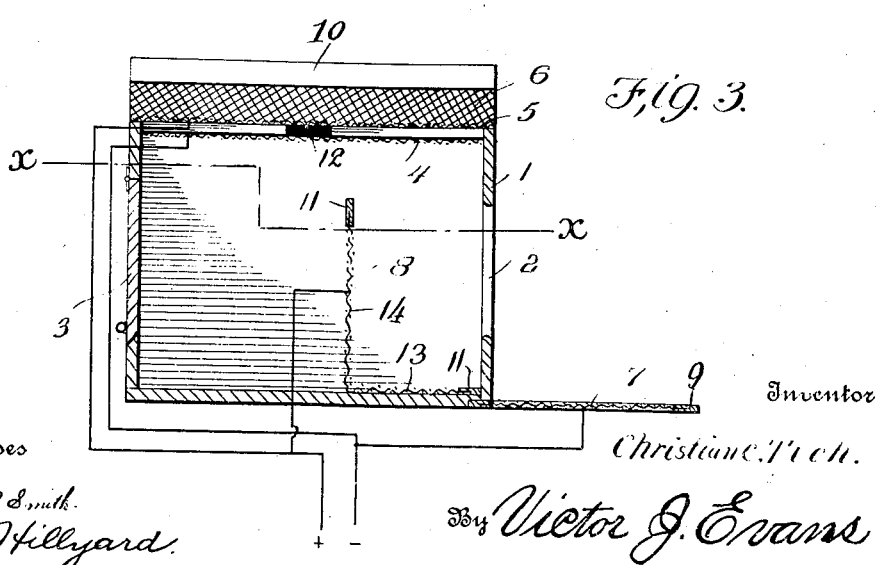
Figure 2:
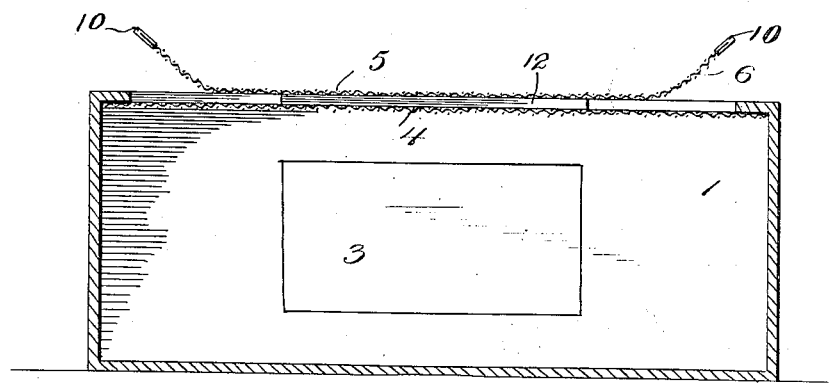
Figure 4:
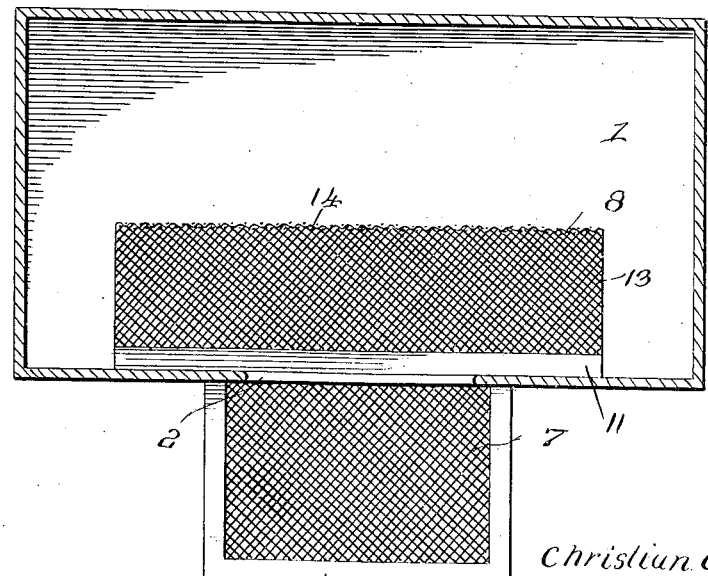

Referring to the drawings, forming a part of the specification, Figure 1 is a perspective view of an electric exterminator embodying the invention. Fig. 2 is a longitudinal section thereof. Fig. 3 is a transverse section. Fig. 4 is a horizontal section on the line $x$—$x$ of Fig. 3.

Corresponding and like parts are referred to in the following description, and indicated in all the views of the drawings, by the same reference characters.

The device comprises a box-like structure 1, which may be of any construction, the same having an entrance 2 and a door 3, the latter admitting of baiting the device so as to attract the animals, insects and the like to be exterminated. The top of the box is open and is supplied with a screen 4. A second screen 5 is placed above the screen 4 and is spaced therefrom a short distance, the end portions of the screen 5 being upwardly deflected, as indicated at 6, to provide flared entrances into the space formed between the two screens. The screens 4 and 5 are connected with an electric circuit and constitute terminals of such circuit. The screens 4 and 5 constitute electrodes by reason of their electrical conductivity. While the screens 4 and 5 are preferably formed of wire fabric it is to be understood that foraminous or reticulated metal plates may be employed or metal sheets. The screen electrodes are preferred because of their more positive action and furthermore because a ready discharge is provided for foreign matter which may tend to obstruct the passage between the screens or electrodes. A platform 7 extends outwardly from the box opposite the entrance 2 and forms a rest for rodents or other animals desiring to enter the structure. This platform 7 is electrically connected with a terminal of the circuit. Within the box and near the entrance 2 is located an electrode 8 which is connected to the other terminal of the circuit. The electrode 8 consists of a piece of wire fabric, but it is obvious that a piece of sheet metal may be advantageously employed. The platform 7 and electrode 8 are so arranged that an animal attempting to enter the box will touch the platform with its hind feet and the electrode 8 with its fore feet, thereby completing the circuit which electrocutes the same. Any insects attempting to enter the box alight upon the end portions of the screen 4 and pass into the space formed between the screens 4 and 5, the lower part of the body touching the screen 4 and the upper part of the body coming in contact with the screen 5, thereby causing the circuit to pass through the insect and electrocute it.

For the reasons herein stated it is preferred to construct the various electrodes of wire fabric and to stiffen, strengthen and give a finished appearance to the edges thereof a metal binding is applied to such edges. This binding is illustrated at 9 as applied to the platform, at 10 as applied to the ends of the electrode 5 and at 11 as applied to the edges of the electrode 8. A spacing strip 12 of insulating material is placed between the screens 4 and 5 to hold them separated the required distance and thereby prevent short circuiting.

The electrode 8, as shown most clearly in Fig. 3, comprises a horizontal portion 13 and an upright or vertical portion 14, the horizontal portion 13 being located adjacent the door opening 2 and the vertical portion 14 being spaced from said door opening and having its upper edge spaced a short distance from the electrode 4. The electrodes 4 and 8 are electrically connected to opposite poles of the current generator, hence should an animal perchance pass through the door opening 2 without touching the electrode 9 it would come in contact with the electrodes 4 and 8 in an attempt to pass over the upright portion 14 of the electrode 8 and thereby become electrocuted by the current passing through its body.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. An electric exterminator comprising a box having a door opening in a side, an electrode extending over the top of the box, and a second electrode arranged within the box approximately parallel with the wall having the door opening and spaced therefrom and terminating a short distance from the top to leave a space for the passage of the animal when entering the box, the two electrodes being of opposite polarity.

2. An insect exterminator comprising a box having a side left open, an electrode extended over the open side and having connection with one terminal of an electric circuit, and a second electrode spaced from the first mentioned electrode and having its edge portions upwardly deflected to provide a flared entrance, said second electrode constituting the other terminal of the electric circuit.

3. An exterminator for insects, rodents and other pestiferous animals, the same consisting of a box open at the top and having a side entrance, a screen extended over the top of the box and forming an electrode, a second screen arranged above the first mentioned screen and serving to reinforce it and to form an electrode of opposite polarity, a plate located within the box opposite the entrance and having its upper edge spaced from the screened top of the box and forming an electrode of opposite polarity from the lower screen, and a platform opposite the entrance and constituting an electrode of opposite polarity to the before mentioned plate.

4. An electric exterminator comprising a box having a door opening, a platform exterior to the box opposite the door opening, a screen extending over the top of the box and forming an electrode, another electrode arranged within the box and comprising approximately horizontal and vertical portions, the horizontal portion being arranged adjacent the door opening and the vertical portion being spaced from said door opening and from the top of the box, the screen top and the said platform being electrically connected with one pole of a current generator and the electrode within the box having connection with the other pole of the current generator.

In testimony whereof I affix my signature in presence of two witnesses.

CHRISTIAN C. TUCH.

Witnesses:
EDWIN D. CASTERLINE,
FRANK J. KRUGER.